United States Patent [19]

McMurtry

[11] 4,360,973
[45] Nov. 30, 1982

[54] PROBE FOR USE IN MEASURING APPARATUS

[75] Inventor: David R. McMurtry, Gloucestershire, England

[73] Assignees: Rolls Royce Limited; Renishaw Electrical Ltd., both of Great Britain

[21] Appl. No.: 267,068

[22] Filed: May 26, 1981

Related U.S. Application Data

[63] Continuation of Ser. No. 39,786, May 17, 1979, Pat. No. 4,288,925, which is a continuation of Ser. No. 864,151, Dec. 23, 1977, abandoned.

[30] Foreign Application Priority Data

Dec. 24, 1976 [GB] United Kingdom ............... 54032/76
May 28, 1977 [GB] United Kingdom ............... 22656/77

[51] Int. Cl.³ ................................................ G01B 7/28
[52] U.S. Cl. ................................ 33/174 L; 33/169 R; 33/172 E
[58] Field of Search ............. 33/174 L, 174 R, 174 P, 33/169 R, 172 E, 148 H, 149 J

[56] References Cited

U.S. PATENT DOCUMENTS

| 3,016,619 | 1/1962 | Mueller | 33/172 |
| 3,212,325 | 10/1965 | Katz et al. | 73/88.5 |
| 3,277,248 | 10/1966 | Melvin, Jr. | 200/6 |
| 3,520,063 | 7/1970 | Rethwish et al. | 33/169 |
| 3,541,924 | 11/1970 | Gambin | 90/62 |
| 3,557,462 | 1/1971 | Kiewicz et al. | 33/174 |
| 3,670,420 | 6/1972 | Kiewicz et al. | 33/174 L |
| 3,673,695 | 7/1972 | Rethwish et al. | 33/172 |
| 3,855,708 | 5/1975 | Parry | 222/100 |
| 3,869,799 | 3/1975 | Neuer et al. | 33/174 L |
| 3,945,124 | 3/1976 | Jacoby et al. | 33/169 R |
| 4,130,941 | 12/1978 | Amsbury | 33/174 L |
| 4,136,458 | 1/1979 | Bell et al. | 33/174 L |

FOREIGN PATENT DOCUMENTS

| 2346031 | 1/1975 | Fed. Rep. of Germany | 33/174 L |
| 92567 | 9/1972 | German Democratic Rep. | 33/174 L |
| 1348367 | 3/1974 | United Kingdom | 33/174 L |

OTHER PUBLICATIONS pp. 7 & 8 of the Western Electric Technical Digest No. 6, Apr. 1967.
A Brochure of Digital Electronic Automation S.p.A. (DEA) which is believed to have been published in Jul. 1975.

*Primary Examiner*—Willis Little
*Attorney, Agent, or Firm*—Stevens, Davis, Miller & Mosher

[57] ABSTRACT

A probe for use in measuring apparatus has a base member including a two-dimensional seat for an intermediate member which, in turn, includes a two-dimensional seat for a stylus holder. The two seats face in opposite directions so that the stylus holder can be displaced from the seated position in either of two opposite directions.

9 Claims, 9 Drawing Figures

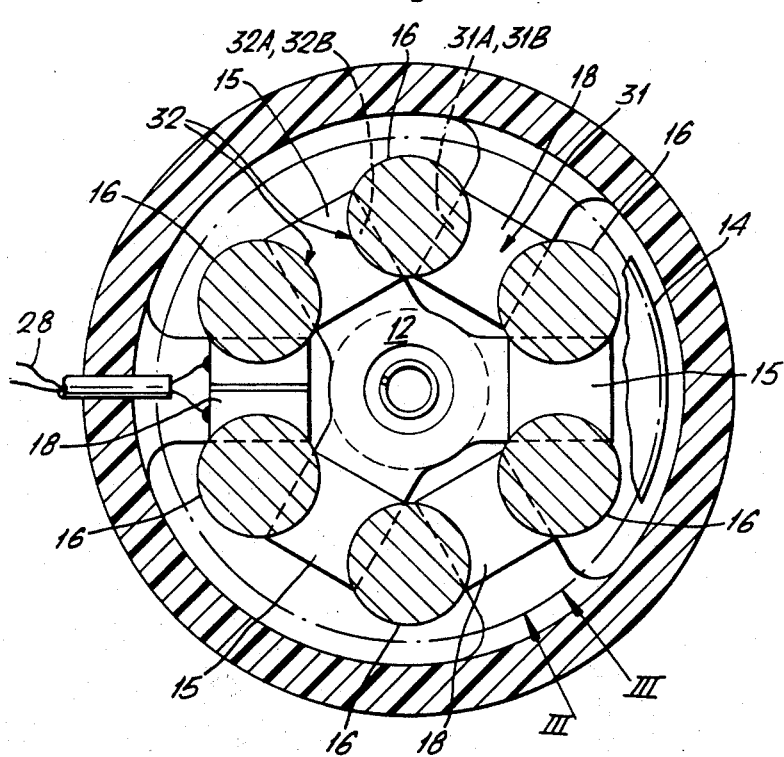

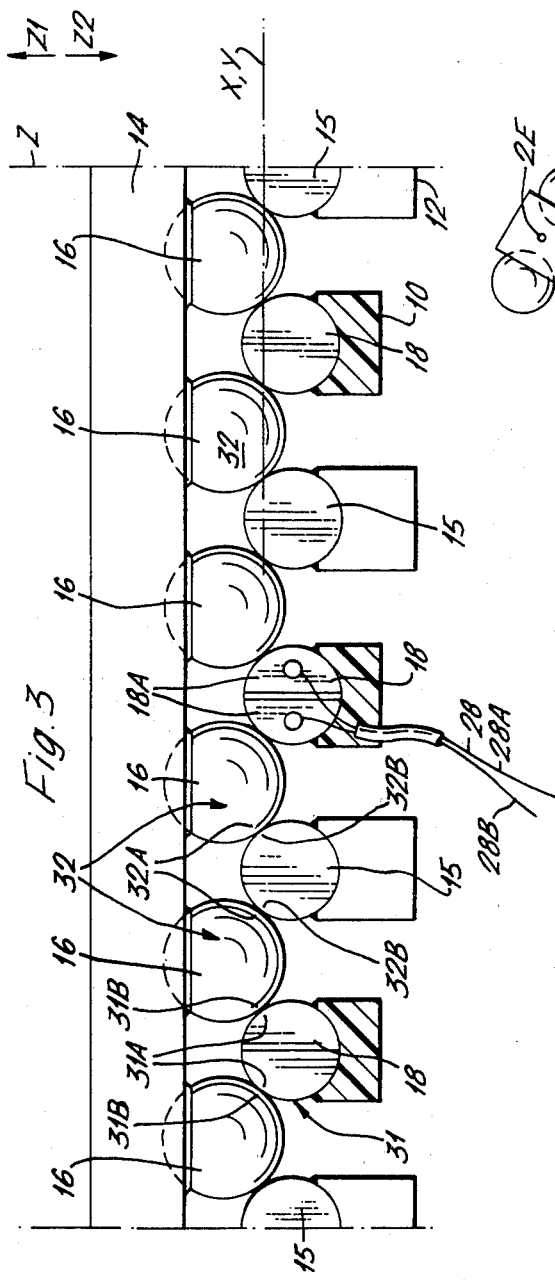
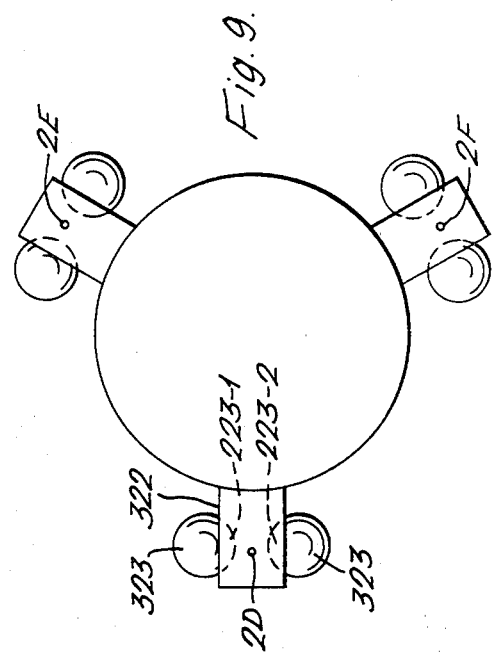
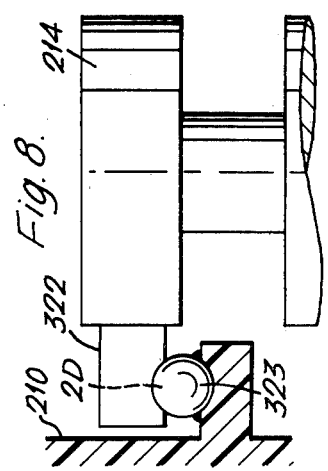

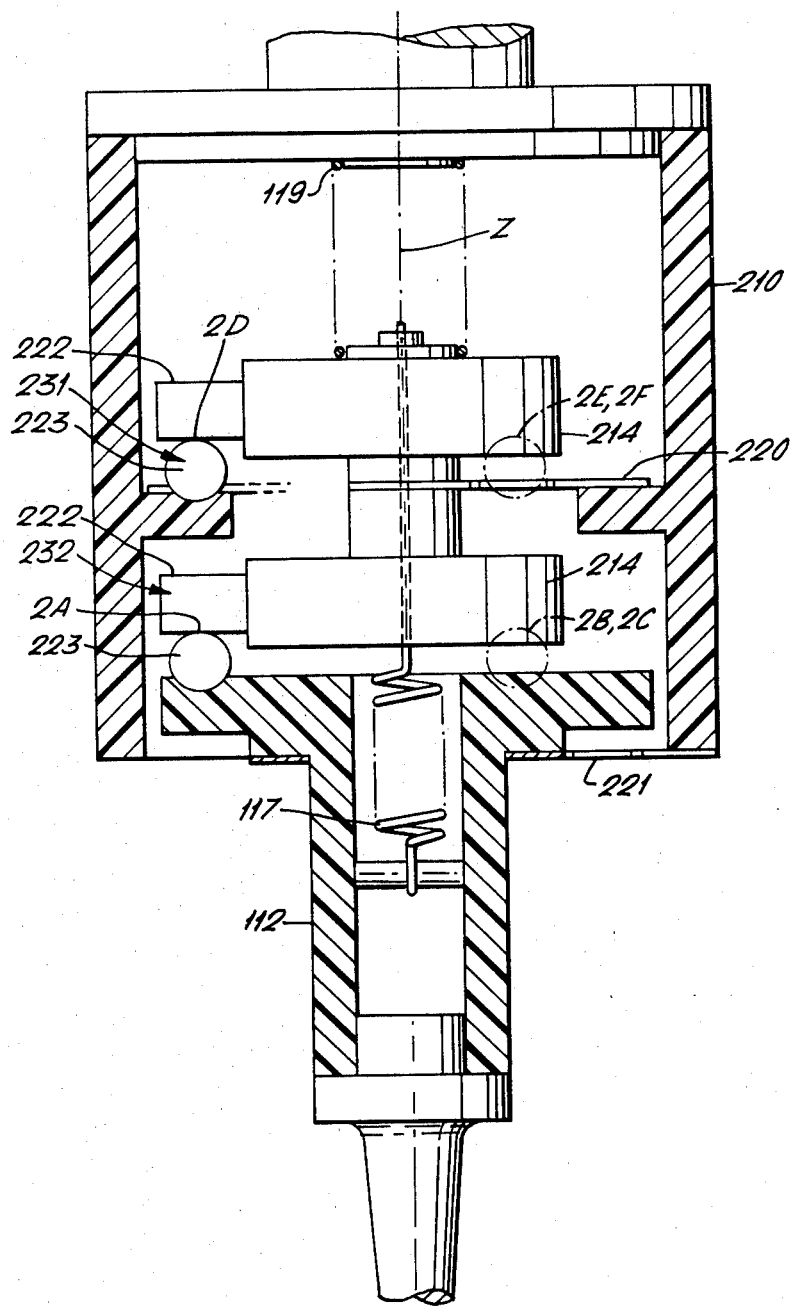

PROBE FOR USE IN MEASURING APPARATUS

This is a continuation of application Ser. No. 39,786 filed May 17, 1979 now U.S. Pat. No. 4,288,925 which in turn is a continuation of Ser. No. 864,151 filed Dec. 23, 1977, now abandoned.

This invention relates to probes for use in measuring apparatus.

It is known for such probes to be connected to the head of a measuring machine for operations typically consisting in moving the head until a stylus mounted on the probe contacts a workpiece to be measured, and recording the position of the head of the machine in relation to a datum at the moment of contact between stylus and the workpiece. To make such operations possible the stylus is displaceable by a small amount relative to a part of the probe fixed to the head so as to allow the machine to slightly overrun the position at which the stylus contacts the workpiece.

A known such probe comprises a stylus holder biased into engagement with a two-dimensional seat provided on a base member. In operation, if a stylus connected to the holder is displaced in a direction parallel to the plane of the seat, the displacement is accommodated by tilting of the holder on the seat if the stylus is disposed in the direction in which the seat faces, then the displacement is accommodated by the holder lifting off the seat in that direction. But it is not possible in the known probe to displace the stylus in the direction opposite to that in which the seat is facing. This is a limitation on the usefulness of the probe and it is an object of this invention to overcome this difficulty.

According to this invention there is provided a probe for use in measuring apparatus, comprising a base member including a first two-dimensional seat, an intermediate member, bias means connected to urge the intermediate member into engagement with the first seat thereby to support the intermediate member on the first seat, the intermediate member being tiltable on, and being linearly separable from, the first seat in opposition to the bias means, a second two-dimensional seat provided on the intermediate member and facing in a direction opposite to that in which the first seat faces, a stylus holder, a further bias means connected to urge the stylus holder into engagement with the second seat thereby to support the stylus holder on the second seat, the stylus holder being tiltable on, and being linearly separable from, the second seat in opposition to the further bias means.

Examples of probes according to this invention will now be described with reference to the accompanying drawings wherein:

FIG. 2 is a section on the line II—II in FIG. 1.

FIG. 3 is a section on the line III—III in FIG. 2

FIG. 7 is a view similar to FIG. 4 but showing a modification.

FIG. 8 is a detail of FIG. 7 showing a further modification.

FIG. 9 is a plan view of FIG. 8.

Figure 1:
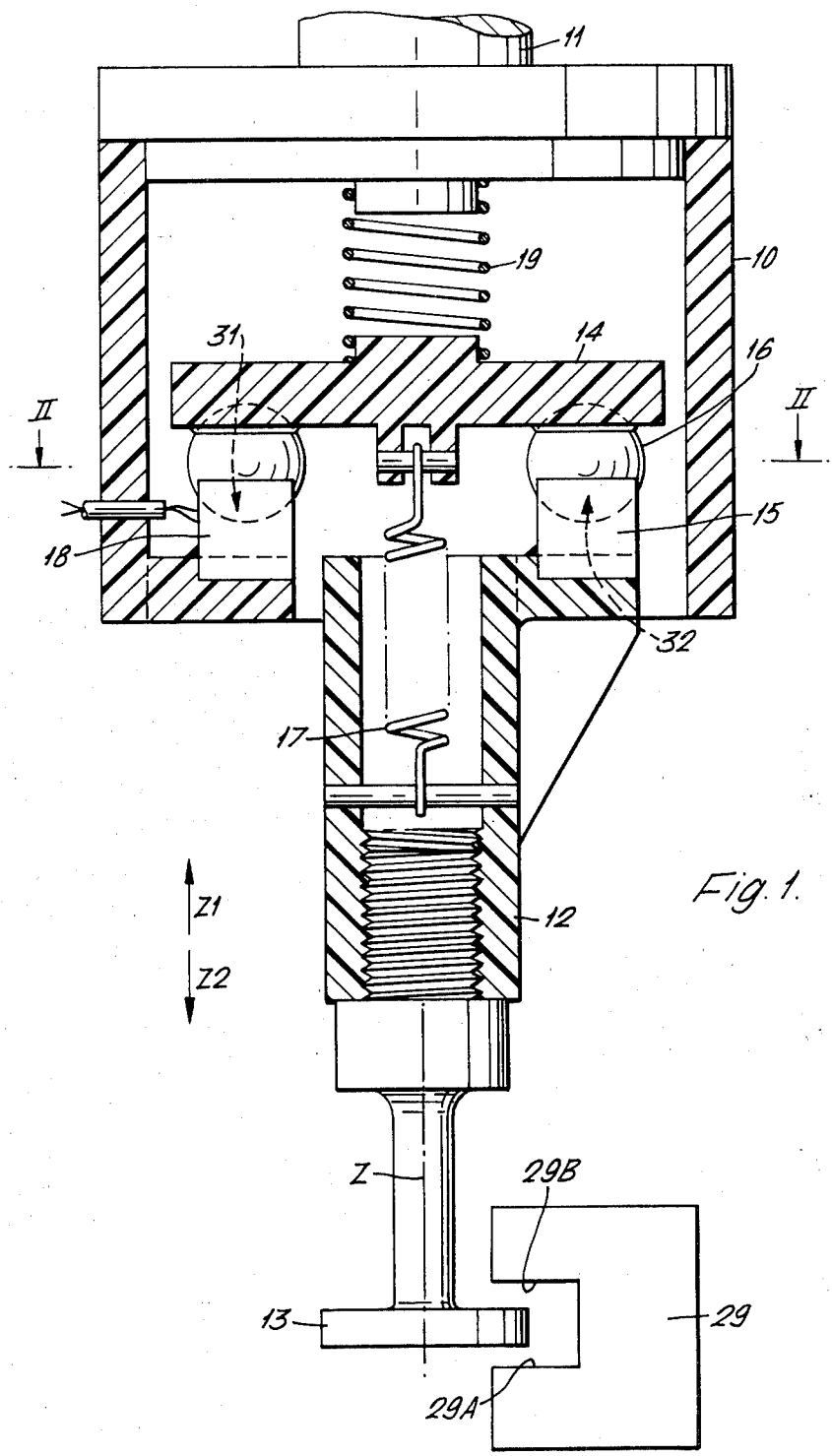
FIG. 1 is a sectional elevation of a probe according to a first example.

The probe shown in FIGS. 1 to 3 has a base member or housing 10 provided with a spigot 11 for attachment to the head of a measuring machine. A stylus 13 is connected to a stylus holder 12 which is supported on the housing 10 through the intermediary of an intermediate member 14. The member 14 is supported on a first seat 31 defined on three cylindrical support members 18 secured to the housing 10, and the holder 12 is supported on a second seat 32 defined on six spherical support members 16 secured to the member 14. As will be seen the members 16 serve both as a seat for the holder 12 and as supports for the member 14 on the seat 31. For the purpose of its support on the seat 32 the holder 12 has three cylindrical support members which are interdigited with the members 18 (FIG. 2). A spring 19 urges the member 14, and thus the holder 12, against the seat 32, and the holder 12 itself is urged against the seat 32 by a spring 17. The stylus or the holder are said to be in the rest position when both the seats 31,32 are fully engaged as is more particularly described hereinbelow.

The seat 31 is constituted by surface elements 31A (FIG. 3) of the members 18. The elements 31A co-operate with confronting surface elements 31B of the members 16 to support the member 14.

The seat 32 is constituted by surface elements 32A of the members 16. The elements 32A co-operate with confronting surface elements 32B of the members 15 to support the holder 12.

The seat 31 faces upwards (FIGS. 1 and 3), i.e. the direction of an arrow Z1, while the seat 32 face downwards in the direction of an arrow Z2. In consequence the holder 12 can be moved downwards against the force of the spring 17 and upwards against the force of spring 19, and in each case the relevant spring returns the holder 12 into the rest position.

It is clear from FIG. 3 that the seats 31,32 lie in a common plane XY and that the seats 31,32 co-operate to positively locate the holder 12 in a position along an axis Z perpendicular to the plane XY.

The three members 18 are arranged on radial axes symmetrically about the axis Z (FIG. 2). Accordingly there are three pairs of surface elements 31A arranged symmetrically about the axis Z. The same axisymmetry applies to the elements 31B and the elements 32A,32B. Each pair of adjacent surface elements 31B constitute a pair of convergent surfaces, and the three such pair present in the arrangement co-operate to positively constrain the holder 12 against movement transversely to the axis Z and against rotation about the axis Z. Similar constraint is provided by the convergence of the surface elements 32A.

It will be clear that the six support members are used both for sealing on the seat 31 and for themselves defining the seat 32. It may therefore be said that any set of three annularly successive members 16 contains a first and a second member 16 defining a pair of the convergent surface elements 31B between which one of the support members 18 is situated, the set further containing a second and a third member 16 defining a pair of the convergent surface elements 32A between which one of the support members 15 is situated.

The construction described is effective in constraining the holder 12 and thus the stylus 13 positively against any movement, whether linear or rotational, while nevertheless allowing complete freedom of movement under the action of any force capable of overcoming the force of the springs 17 or 19. In particular the stylus can be moved in either sense of direction along the axis Z so that, for example, a workpiece 29, having surfaces 29A and 29B confronting one another in the direction of the axis Z, can be probed by the stylus B. Probing of the surface 29A involves operating the measuring machine to lower the probe until the stylus 13 engages the surface 29A and engagement with the seat 31 is broken. Correspondingly, the surface 29B is probed by operating the machine to raise the probe until the stylus engages the surface 29B and engagement with the seat 32 is broken. It will be clear that as the machine returns from the probing motion, and the force which caused displacement of the stylus ceases, the springs return the stylus to the fully constrained or rest position.

Displacement of the stylus from the rest position is sensed by an electric circuit 28A. To this end the housing 10, member 14 and holder 12 are made of insulating material while the members 15,16,18, being made of hardened and polished steel, are made of conductive material. One of the members 18 is divided into mutually insulated halves (FIG. 3) respectively connected to two conductors 28A,28B of the circuit. It will be clear that in this arrangement each pair of surface elements 31A,31B or 32A,32B constitutes a switch and that all such switches are related in series in the circuit 28. Therefore, if the rest position of the stylus is disturbed at least one of these switches must open and change the state of the circuit 28. This change of state is used, as is known per se, to indicate that engagement has taken place between the stylus and the workpiece.

Figure 4:
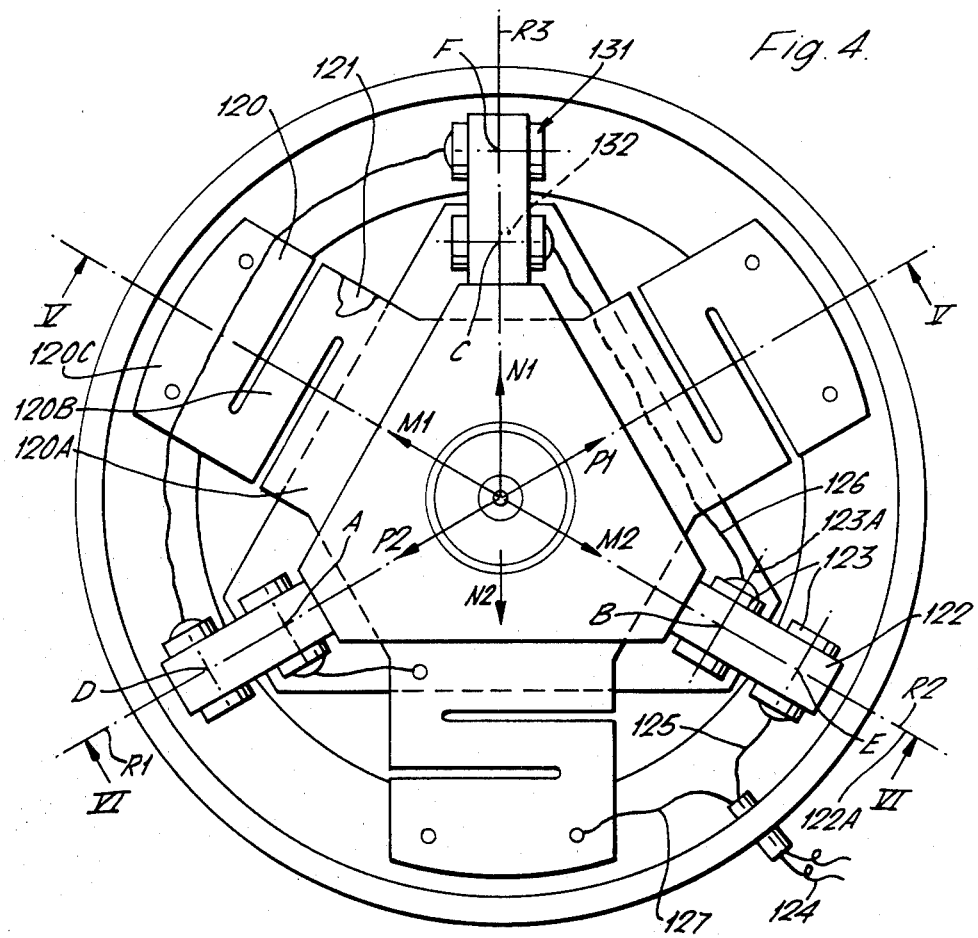
FIG. 4 is a sectional plan view of a probe according to a second example.
Figure 5:
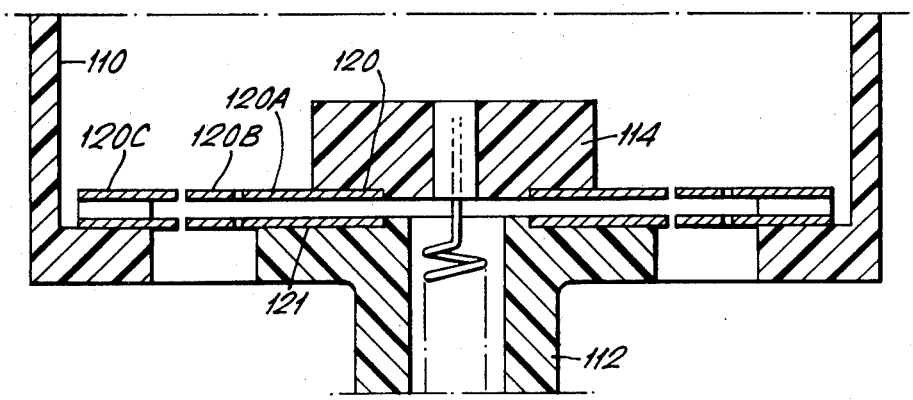
FIG. 5 is a section on the line V—V in FIG. 4.
Figure 6:
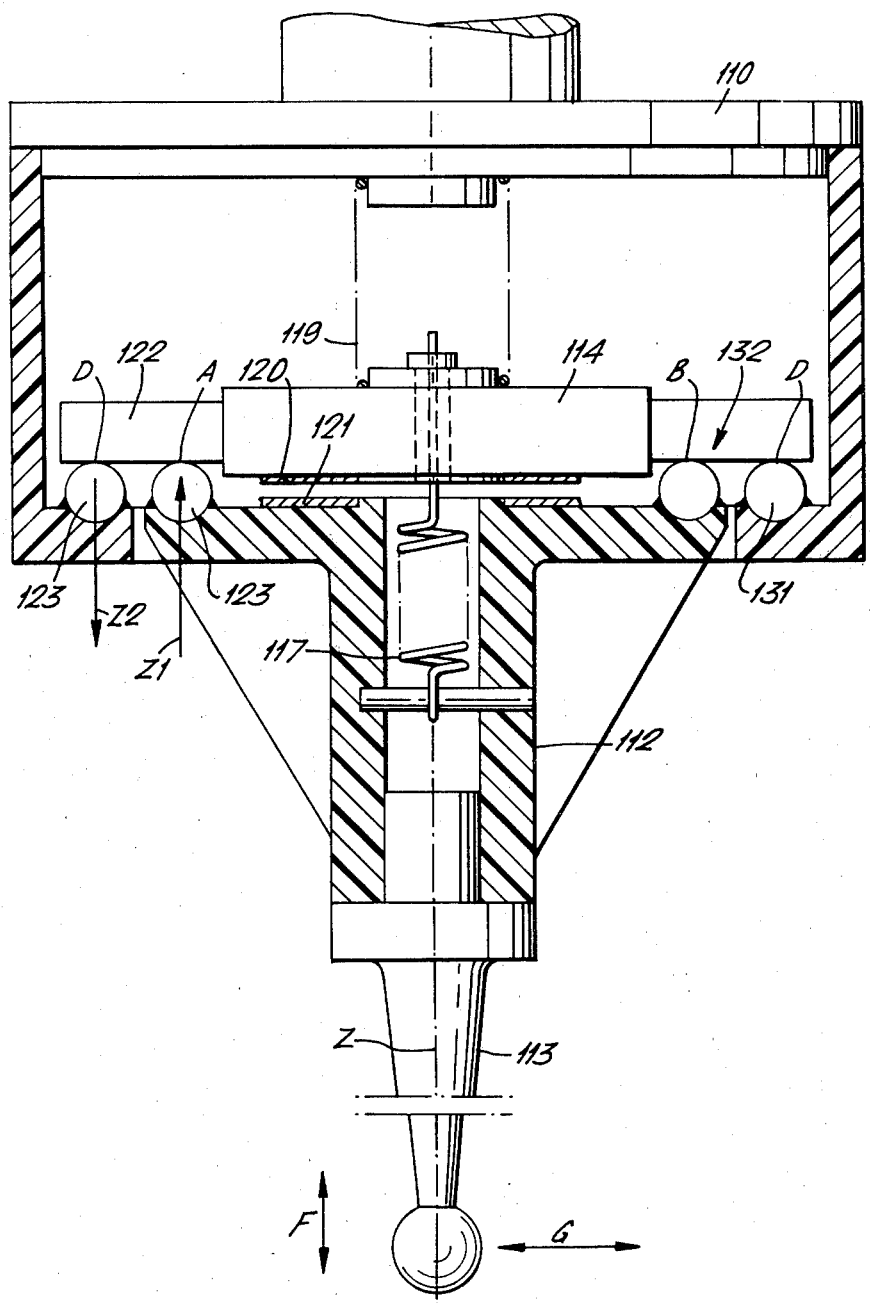
FIG. 6 is a section on the line VI—VI in FIG. 4.

The probe shown in the FIGS. 4 to 6 comprises a stylus 113 (FIG. 6) connected to a holder 112 urged by a spring 117 into engagement with an intermediate member 114 at three locations A,B,C symmetrically spaced about a reference axis Z. The force of the spring is in the direction of an arrow Z1 parallel to the axis Z. The intermediate member 114 itself is urged by a spring 119 into engagement with a base member or housing 110 at three locations D,E,F also symmetrically spaced about the axis Z but the force of the spring 119 is in the direction of an arrow Z2 opposite to the direction of the arrow Z1.

The drawings show the holder in the rest position. In this position the holder is constrained against in any linear or pivotal movement. Constraint against linear movement in the direction of the axis Z (FIG. 6) is provided by the locations A to F. These locations also provide constraint against movement about any axis transverse to the axis Z, i.e. against tilting of the holder about any one or two of the locations A to F. The holder is displaceable against these two constraints in opposition to the springs 117 or 119 by a force F acting on the stylus in the appropriate sense. When the force ceases, the springs 117 or 119 return the holder, and with it the stylus, into the rest position.

Constraint against displacement transverse to the axis Z and rotation about that axis is provided by two planar springs 120,121 which, respectively, connect the intermediate member 114 and the holder 112 to the housing. The spring 120 has a central part 120A adhered to the intermediate member 114 and three circumferential parts 120B each extending between the central part 120A and a flange 120C secured to the housing 110. The circumferential parts 120B accommodate the displacement of the intermediate member in the direction of the axis Z or about any of the locations A to F but ensure that when the displacing force ceases the intermediate member is returned from any incidental displacement transversely to or about the axis Z. The spring 121 is identical with the spring 120 and is connected between the intermediate member 114 and the housing 110.

Each location A to F is defined by the point of contact between an upper and a lower cylindrical support member 122,123, respectively, arranged on mutually perpendicular axes 122A,123A (FIG. 4). The upper member 122 extends from the intermediate member 114, its axis 122A being radial in respect of the axis Z. The lower member 123 is secured to the holder 112 or the housing 110 as the case may be.

At the first locations A,B,C, the three members 122 collectively define a two-dimensional seat 132 lying in a plane perpendicular to the axis Z and supporting the holder 112 against tilting on the members 122. The members 123 of the locations A,B,C each define a convex surface element confronting a respective convex surface element defined by the adjacent member 122, and the surface elements of the members 122,123 cooperate to effect the support of the holder 112 on the intermediate member 114. At the locations D,E,F the members 123 collectively define a two-dimensional seat 131 lying in the same plane as the seat 132 and supporting the intermediate member against tilting on the members 123 the housing 110. The seat 131 faces in the direction of the arrow Z1 while the seat 132 faces in the opposite direction, i.e. the direction of the arrow Z2.

For the purpose of sensing displacement of the stylus, the members 122,123 at each of the locations A to F are constituted electrical switches. To this end, the holder 112, intermediate member 114 and housing 110 are made of synthetic resin while the members 122,123 are made of hardened and polished steel. Each switch is defined by a pair of upper and lower members 122,123. Each upper member 122 forms two distinct switches with the respective two lower members 123 which the upper member engages. The switches at the respective locations A to F are connected in series in a circuit 124 (FIG. 4) so that the state of the circuit is changed when any one of the switches is opened. The circuit 124 comprises a conductor 125 to the lower member 123 at location E, a conductor constituted by the adjacent upper member 122, a conductor 126 between the lower members 123 of locations B,C and so on through the locations C,F; F,D and D,A. The lower member 123 at location A is connected through the spring 120 to a return conductor 127 to complete the circuit.

The first locations A,B,C have as nearly as is practicable the same angular positions about the axis Z as the respective second locations D,E,F. In other words there are three pairs of locations A,D; B,E and C,F where each such pair comprises a first location on the holder 112 adjacent a respective second location on the housing 110. In the present example each first location A,B or C is situated on a common radius R1, R2 or R3 with a respective second location D,E or F. Each second location is merely spaced radially from its adjacent first location to the extent necessary for siting the two locations on the holder and the housing respectively.

In operation, when a force G is applied to the stylus in the sense causing the holder 112 to tilt, the moment necessary to tilt the holder about an axis through a single one of the locations A to F is greater than the moment necessary to tilt the holder about an axis through locations A to C or D to F. In the latter situation the moment is a minimum. The angular positioning of the locations A to F described hereinabove provides in effect six hexagonally related axes of minimal moment.

If the stylus is moved in the direction M1 (FIG. 4) the holder tilts downwards about an axis AC, i.e. an axis through the locations A and C, and switch contact is broken at locations D,F and B. If the stylus 113 is moved in the opposite direction M2 the holder tilts upwards about an axis DF and switch contact is broken at locations A,C and E. Since the axes AB and DF are substantially the same distance from the axis Z, the respective tilting moments necessary to displace the stylus in the directions M1,M2 are substantially the same. A similar situation arises when the directions of stylus displacement are N1 and N2 or P1 and P2. It follows that although the stylus is supported on sets of three locations so as to satisfy stability when in the rest position, there are in effect six hexagonally related axes about which the stylus can tilt. The moments necessary to tilt the stylus are therefore substantially the same for any direction of the tilting force transverse to the axis Z, and the small but unavoidable bending of the stylus due to such force is correspondingly free from the variations experienced with a single set of three locations.

As regards stylus displacement in the direction of the axis Z, it is clear from FIG. 6 that the stylus can be moved in either sense Z1 or Z2. When moving in sense Z1 switch contact is broken at the locations D,E,F. When moving in the opposite sense Z2 switch contact is broken at the locations A,B,C.

In a modification, not illustrated, the springs 120,121 are dished when free so that when the springs are assembled in the probe the spring 121 exerts a force in the sense Z1 to urge the holder 112 against the intermediate member 114. Similarly, the spring 120, when assembled, exerts a force in the sense Z2 to urge the intermediate member 114 against the housing. Under these circumstances the springs 117,119 can be dispensed with or relatively weak such springs are sufficient to supplement or adjust the force of the springs 120,121.

In the example described with reference to FIGS. 4 to 6 there are two sets of three locations, viz the locations A,B,C and D,E,F, wherein the locations of the one set have substantially the same angular position about the axis as the other set. It will be appreciated that although an arrangement of three locations per set has stability and avoids redundancy of locations, it is possible to provide more than three locations if desired. If that is done different situations arise depending on whether the number of locations per set is an even or an uneven number. If the number is uneven, as in the case of FIGS. 4 to 6, the locations of the two sets must have substantially the same angular positions if the tilting moments are to be substantially uniform. However, if the number is an even one then the locations of the one set must be situated angularly substantially medially between, and preferably on the substantially the same radius as, the locations of the other set, if the arrangement is to have the benefit of substantially uniform tilting moments.

In a further modification the electrical contact arrangement between the support members 122,123, FIGS. 1 to 3 is dispensed with and instead a proximity sensor or the like is introduced between the stylus holder 112 and the housing 110 or respective such sensors are introduced between the holder 112 and the intermediate member 114 on the one hand and the latter member and the housing 110 on the other hand.

The probe shown in FIG. 7 is similar to that shown in FIGS. 4 to 6 except in that seats 231,232 defined by the support members lie in planes spaced axially along the axis Z. The holder 112 engages an intermediate member 214 at three locations 2A,2B,2C while the intermediate member engages a housing 210 at three locations 2D,2E,2F situated above the locations 2A,2B,2C. At each location 2A to 2F a cylindrical support member 222 secured to the intermediate member engages a cylindrical support member 223 secured to the stylus holder 112 or to the housing 210 as the case may be.

This arrangement makes it possible to position the two sets of locations at like radial distances from the axis Z or otherwise to select their relative radial distance to optimize uniformity of the displacing moment. Also, this arrangement favours a small overall diameter of the housing 210. Compared with FIGS. 4 to 6, the holder 112 is unchanged but the intermediate member 214 has to be of greater axial height than the intermediate member 114 and planar springs 220,221 are of a diameter to suit the reduced diameter housing 210.

In the modification of FIG. 7 shown in FIGS. 8 and 9 each cylindrical support member 223 is replaced by a pair of spherical support members 323 situated so as to define a pair of surface elements 223-1,223-2 which are convergent in the direction of the axis Z. In this case the locations, e.g., the locations 2D,2E,2F, are each defined by a point medially between the respective surface pair 223-1,223-2. The convergent surface elements 223-1,223-2 at the respective locations co-operate to constrain the holder against movement transverse to or about the axis Z when the holder is in the rest position thereby doing away with the planar springs 220,221.

I claim:

1. A device for mounting a stylus in positioning-determining apparatus wherein said device and an object are movable relative to each other for engaging the stylus with the object thereby to sense the position thereof, said device comprising a base member having a first two-dimensional seat thereon, an intermediate member, first bias means connected to the base member and the intermediate member to urge the intermediate member into engagement with the first seat thereby to support the intermediate member on the first seat in a rest position, the intermediate member being tiltable on, and being linearly separable from, the first seat when disposed from said rest position in opposition to the first bias means, a second two-dimensional seat provided on the intermediate member and facing in a direction opposite to that in which the first seat faces, a stylus holder to which a stylus is connectable, a second bias means connected to the stylus holder and the intermediate member to urge the stylus holder into engagement with the second seat thereby to support the stylus holder on the second seat in a rest position, the stylus holder being tiltable on, and being linearly separable from, the second seat when displaced from said rest position in opposition to the second bias means, and means for providing a signal when said stylus engages the object.

2. A device according to claim 1, further comprising an axisymmetric arrangement of support members defining said first seat, the intermediate member includes an axisymmetric arrangement of support members co-operating with said support members defining said first seat to support the intermediate member, the intermediate member includes an axisymmetric arrangement of support members defining said second seat, and the stylus holder includes an axisymmetric arrangement of support members co-operating with the said support members defining the second seat to support the stylus holder.

3. A device according to claim 2, wherein the support members defining the first seat and the support members defining the second seat are arranged alternately in annular succession.

4. A device according to claim 3, wherein in any set of three annularly successive support members included in the intermediate member a first and second member of the set define a pair of convergent surface elements, each of the support members defining the first seat is situated between a said pair of convergent surface elements and co-operates therewith to support the intermediate member, the second and third member of said set define a further pair of convergent surface elements, and each of the support members provided on the stylus holder is situated between a further pair of convergent surface elements for the stylus holder to be supported thereby.

5. A device according to claim 2, wherein the support members included in the intermediate member each comprise respective first cylindrical support surfaces whose axes lie in a common plane, the support members defining the first seat each comprise a second cylindrical support surface, the support members included in the stylus holder each comprise a third cylindrical support surface, wherein the second and third support surfaces are arranged in pairs each having one second and one third said surface arranged adjacent one of the first said surfaces in positions such that the axes of the second and third said surfaces are transverse to the axis of the first said surface, and locating means for locating the intermediate member and the stylus holder against dis-placement in said plane.

6. A device according to claim 5, wherein the axes of said first cylindrical surfaces extend radially from a common axis.

7. A device according to claim 5 or 6, wherein said locating means comprise a first planar spring connected between the base member and the intermediate member and a second planar spring connected between the base member and the stylus holder.

8. A device according to claim 1, wherein said base member comprises a supportable end and a free end and wherein said first seat faces said supportable end, said intermediate member is situated between said first seat and said supportable end, and said stylus holder is situated at the side of the intermediate member remote from said supportable end.

9. A device according to claim 8, wherein said first bias means comprise a compression spring arranged between the intermediate member and said supportable end, and said second bias means comprise a tension spring connected between the stylus holder and the intermediate member.

* * * * *